United States Patent [19]
Pryor
[11] 3,728,532
[45] Apr. 17, 1973

[54] CARRY SKIP-AHEAD NETWORK

[75] Inventor: Richard Lee Pryor, Cherry Hill, N.J.
[73] Assignee: RCA Corporation, New York, N.Y.

[22] Filed: Jan. 21, 1972
[21] Appl. No.: 219,719

[52] U.S. Cl. .......................... 235/175
[51] Int. Cl. .......................... G06f 7/50
[58] Field of Search .......................... 235/175

[56] References Cited

UNITED STATES PATENTS

| | | | |
|---|---|---|---|
| 3,681,584 | 8/1972 | Wolf | 235/175 |
| 3,612,847 | 10/1971 | Jörgensen | 235/175 X |
| 3,465,133 | 9/1969 | Booher | 235/175 |
| 3,437,801 | 4/1969 | Wilhelm et al. | 235/175 |

OTHER PUBLICATIONS

I. Flores, The Logic of Computer Arithmetic, Prentice-Hall, Inc., 1963, pp. 83–98.
M. Lehman et al., "Skip Techniques for High-Speed Carry-Propagation in Binary Arithmetic Units," IRE Trans. on Electronics Computers, 12/61, pp. 691–698.

*Primary Examiner*—Malcolm A. Morrison
*Assistant Examiner*—David H. Malzahn
*Attorney*—H. Christoffersen et al.

[57] ABSTRACT

A network for use with arithmetic units such as adder circuits wherein a large number of bits are added together. Provision is made for evaluating the added bits in conjunction with the carry-in signal supplied to the adder so that the carry signal may be "skipped ahead," i.e. passed over, one or more adder circuit segments in order to avoid the delay of propagating a carry signal through each adder circuit segment in the arithmetic unit.

6 Claims, 3 Drawing Figures

CARRY SKIP-AHEAD NETWORK

STATEMENT

The invention described U.S. was made in the performance of work under a NASA contract and is subject to the provisions of Section 305 of the National Aeronautics and Space Act of 1958, Public Law 85-568 (72 Stat. 435; 42 U.S.C. 2457).

CROSS-REFERENCES AND BACKGROUND

Conditional sum adders and carry ripple networks are known in the art. One description thereof is found in U.S. Pat. No. 3,249,746 entitled "Data Processing Apparatus" by W.A. Helbig et al., which is assigned to the common assignee. Another description of parallel adders which employ parallel gates is found in Chapter 4 of "Arithmetic Operations in Digital Computers," by R.J. Richards, published in 1955 by D. Van Nostrand, Inc. According to these references, the carry ripple gates function to transmit or not transmit a carry signal to the next higher adder stage depending upon the two augend and addend digits already present at the transmitting stage. Certain of the prior art carry ripple gates require an input carry signal to propagate through two or more gating circuits before the output carry signal is produced. Also, certain of the prior art carry ripple gates described in the references cited use three or more logic circuits to generate the carry signal. It is apparent that the adder speed can be increased by decreasing the time required for the carry circuit to transmit the carry signal.

Moreover, by implementing the carry ripple network using integrated circuit semiconductors, certain improvements in operation time may be effected as well as the inherent advantages of the integrated circuit configuration, such as size requirements and the like.

In addition, even with conditional sum adders and carry ripple networks such as those described supra, it is sometimes determined to be more expeditious in operating arithmetic units to completely bypass operation through certain of the stages, whereby the inherent delay in the individual stages is avoided or eliminated. Thus, if it can be determined that a certain signal condition will exist at a certain circuit portion after operation by a plurality of serially connected carry network elements, it may be desirable and useful to bypass this plurality of circuit segments and supply this certain signal directly to the aforesaid certain circuit portion through a parallel or bypassing circuit loop which is controlled by logic circuitry which detects and determines the necessary signal conditions.

In brief, the subject circuit recognizes that a condition exists wherein an exclusive OR operation upon the addend and augend for each adder segment permits the prediction of the carry signal at a circuit point in the arithmetic unit. Therefore, the predicted signal can be generated rather than having the carry signal ripple through each of the adder segments.

SUMMARY OF THE INVENTION

Each of a plurality of adder stages includes sum logic circuit means which produces a sum output indicative of the logical sum of augend and addend bits applied thereto, and carry logic circuit means which produces a carry output signal in response to a carry input signal from a previous stage, the addend and the augend bits. Gate means receives the sum outputs of a certain succession of adder stages. Circuit means responsive to the output of the gate means selectively applies the carry input signal of the first of said certain succession of stages to the output of the carry logic circuit means of the last of the certain succession of adder stages.

It is a feature of the invention that other, larger bypass loops may be provided for carry signals by providing other circuit means (of the type described) which span a larger number of adjacent adder stages.

DESCRIPTION OF THE PREFERRED EMBODIMENT

Figure 1A:
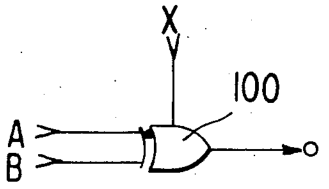
FIGS. 1A and 1B are a block diagram and a schematic diagram, respectively, of a two-way transmission gate.

In the following description, common reference numerals are applied to similar elements or components. Also, for convenience, a signal will be designated by the same reference numeral as the terminal to which the signal is applied.

Referring now to FIG. 1A, there is shown a gate symbol 100 having input terminals A and B, output terminal O and control terminal X. In addition, as explained later, a dot is affixed adjacent one of the input terminals, in this case input terminal A.

Figure 1B:
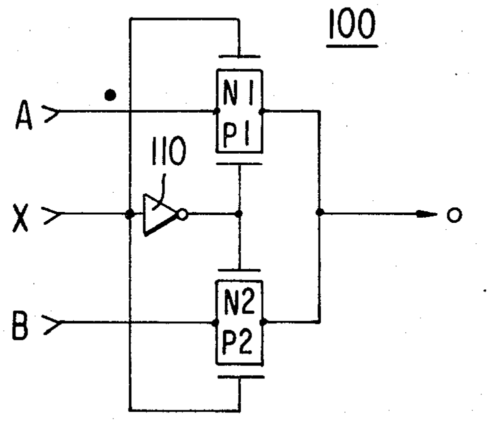

Referring to FIG. 1B, there is shown a schematic representation of the gate shown in FIG. 1A. The schematic diagram in FIG. 1B includes a plurality of semiconductor devices which are shown to be of the metallic oxide semiconductor type hereinafter referred to as MOS type devices. MOS type semiconductor devices are well-known in the art. Briefly, however, it is noted that MOS devices have a conduction path between two terminals normally referred to as the drain and source terminals. In addition, MOS devices have another terminal, normally called the gate electrode, which is insulated from and which controls the conduction through the conduction path. In addition, MOS devices are of two types, namely P-type and N-type devices and may be enhancement or depletion type devices. In a P-type enhancement device, as shown in FIG. 1B, a gate voltage which is negative with respect to the voltage at the source electrode will render the device more conductive. Conversely, a voltage at the gate electrode of an N-type device which is positive with respect to the source electrode thereof will render the N-type device more conductive. This description generally relates to enhancement type MOS devices but the invention is equally applicable with either type of device when the appropriate signal level changes are incorporated.

Referring again to FIG. 1B, semiconductor devices N1 and P1 have the conduction paths thereof connected in parallel. One end of this parallel connection is connected to input terminal A. Similarly, semiconductor devices N2 and P2 have their conduction paths connected in parallel. One end of this parallel connection is connected to input terminal B. The other terminals of both of the parallel connections noted are connected in common to output terminal O. The gate electrodes of devices P1 and N2 are connected together and to the output terminal of inverter 110. The gate electrodes of devices P2 and N1 are connected together and to the input terminal of inverter 110 as well as to control input terminal X. For completeness, a dot is associated with input terminal A. The significance of the dot in FIGS. 1A and 1B is to indicate which input signal to the circuit will be transmitted therethrough when the control signal X is a high level signal.

Thus, if the signal at terminal X is a high level signal, a relatively positive or high level signal is supplied to the gate electrodes of devices N1 and P2 as well as to the input of inverter 110. Inverter 110 supplies a relatively negative or low level signal to the gate electrodes of devices P1 and N2. Incidentally, it should be noted that the terms, relatively negative, low level or binary 0 signals are meant to be interchangeable. Likewise, a binary 1, high level, or relatively positive signal are meant to be interchangable terms.

With the signal conditions noted relative to the circuit in FIG. 1B, it is seen that the transmission gate comprising devices N1 and P1 is rendered conductive, whereby the signal at terminal A (the dotted terminal) is transmitted through to output terminal O. However, the transmission gate comprising devices P2 and N2 is nonconductive and terminal B is decoupled from terminal O.

Conversely, if the signal at terminal X is a low level signal, a low level signal is applied to the gate electrodes of devices N1 and P2. Inverter 110 supplies a high level signal to the gate electrodes of devices P1 and N2. With these signal conditions, it is seen that the transmission gate comprising devices N2 and P2 is rendered conductive while the transmission gate comprising devices N1 and P1 is rendered nonconductive. Consequently, the signal at terminal B is transmitted to output terminal O while input signal A is decoupled from the output. This, briefly, is a description of the operation of the two-way transmission gate.

Figure 2:
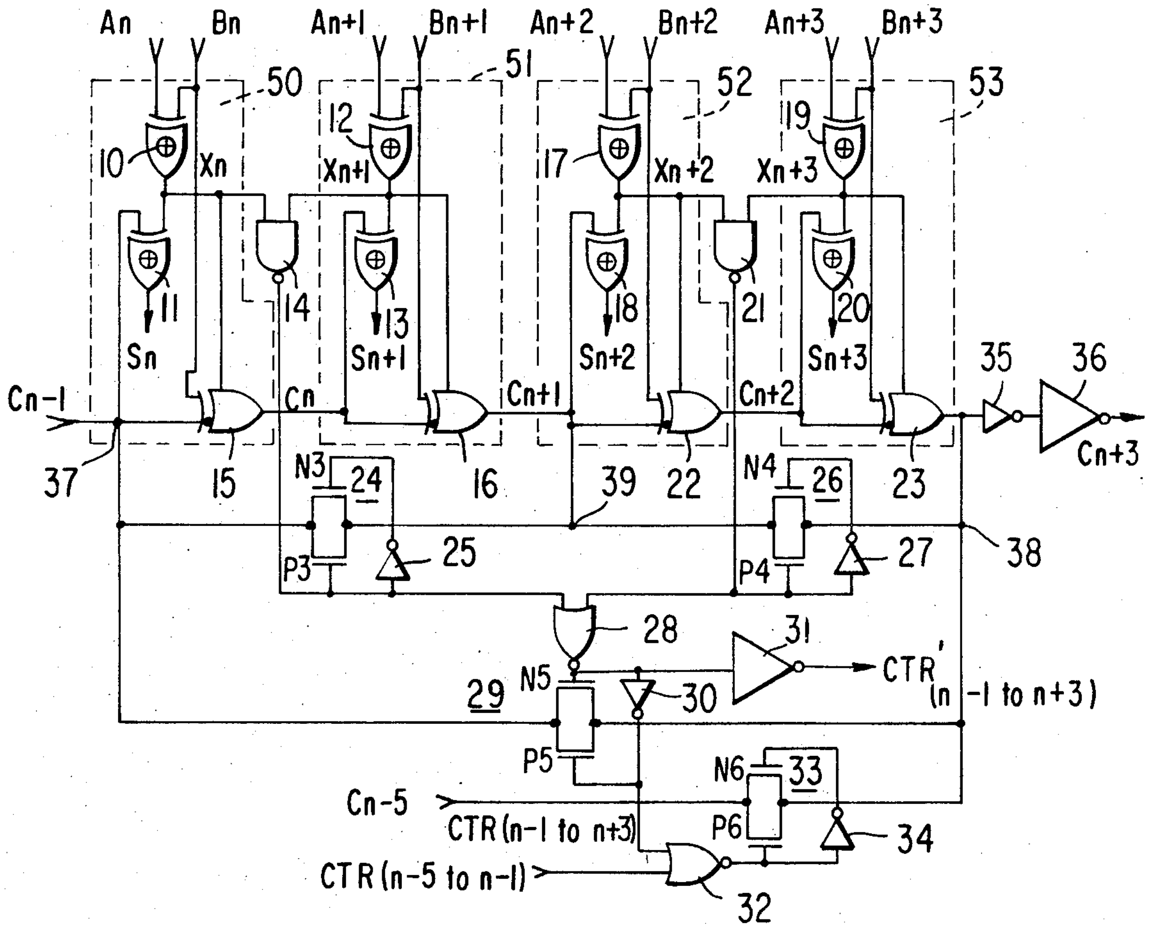
FIG. 2 is a partially schematic, partially block diagram of a portion of an adder circuit wherein a carry skip-ahead network is utilized.

Referring now to FIG. 2, there is shown a schematic diagram of a portion of an adder unit utilizing a carry skip-ahead network which incorporates the two-way transmission gate described supra.

The arithmetic unit includes adder stages 50, 51, 52 and 53. Each of these stages is similar in configuration and in operation. Stage 50 includes exclusive OR gates 10 and 11. The input terminals of exclusive OR gate 10 are connected to input terminals $A_n$ and $B_n$ to receive the addend and augend signals. The output terminal of gate 10 is connected to one input of exclusive OR gate 11. The other input terminal of exclusive OR gate 11 is connected to terminal $C_{n-1}$ via circuit point 37. Circuit point 37 is shown as a common junction but is to be interpreted to include any of the lines associated therewith and functionally equivalent thereto. The output of OR gate 11 is connected to terminal $S_n$, whereat the signal representing the logical sum of the signals at terminals $A_n$, $B_n$ and $C_{n-1}$ appears.

One of the input terminals, in this case the $B_n$ input terminal, is also connected to one input of two-way transmission gate switch 15 which is equivalent to switch 100 described relative to FIGS. 1A and 1B. The dotted input terminal of transmission gate switch 15 is connected to circuit point 37. The output terminal of exclusive OR gate 10 is connected to the $X_n$ or control terminal of switch 15. The output terminal of switch 15 is connected to a succeeding stage as described hereinafter and supplies the signal $C_n$ (i.e. the carry signal from stage 50).

A description of the operation of stage 50 is presented. As noted, gates 10 and 11 are exclusive OR gates. Consequently, when the input signals supplied to the two input terminals of either of these gates are identical, a binary 0 or low level output signal is generated thereby. For example, if the signals at terminals $A_n$ and $B_n$ (which signals are designated as the $A_n$ and $B_n$ signals) are both either binary 0's or binary 1's, the output signal generated by gate 10 is a binary 0. This binary 0 is supplied to an input terminal of gate 11 as well as to the $X_n$ control terminal of gate 15. As described supra, relative to FIGS. 1A and 1B, the application of a binary 0 control signal to terminal $X_n$ of switch 15 causes the signal at the undotted input terminal to be transmitted therethrough to the output terminal and represents signal $C_n$. Thus, output signal $C_n$ from stage 50 then is either a binary 0 or a binary 1 in accordance with the condition of signal $B_n$. This circuit operation is represented by Table I below.

In addition, the level of signal $S_n$ is a function now of the level of the $C_{n-1}$ signal which is applied to an input of gate 11. That is, if $C_{n-1}$ is a binary 0, and the $X_n$ signal is also a binary 0as defined supra) then the $S_n$ signal will be a binary 0. Conversely, if the $C_{n-1}$ signal is a binary 1, then the $S_n$ signal will also be a binary 1. This set of signal conditions is represented in Table I below:

| $A_n$ | $B_n$ | $X_n$ | $C_{n-1}$ | $S_n$ | $C_n$ | Logical Equations | |
|---|---|---|---|---|---|---|---|
| | | | 0 | 0 | 0 | | |
| 0 | 0 | 0 | | | | $C_n \equiv B_n$ | $S_n = X_n \oplus C_{n-1}$ |
| | | | 1 | 1 | 0 | | |
| | | | 0 | 1 | 0 | | |
| 1 | 0 | 1 | | | | $C_n \equiv C_{n-1}$ | $S_n = X_n \oplus C_{n-1}$ |
| | | | 1 | 0 | 1 | | |
| | | | 0 | 1 | 0 | | |
| 0 | 1 | 1 | | | | $C_n \equiv C_n-1$ | $S_n = X_n \oplus C_n-1$ |
| | | | 1 | 0 | 1 | | |
| | | | 0 | 0 | s | | |
| 1 | 1 | 0 | | | | $C_n \equiv B_n$ | $S_n = X_1 \oplus C_n-1$ |
| | | | 1 | 1 | 1 | | |

TABLE I

If the signal levels at terminals $A_{An}$ and $B_n$ are not identical, then gate 10 produces a binary 1 output signal $X_n$. The $X_n$ signal is supplied to one input of gate 11 and to the $X_n$ control terminal of gate 15. With this signal condition, as described supra, the signal at the dotted input terminal is now transmitted by switch 15. Consequently, signal $C_{n-1}$ is transmitted through switch 15 and becomes signal $C_n$ at the output of switch 15. The sum signal $S_n$ is a function of the carry-in signal $C_{n-1}$ and the $X_n$ signal from gate 10. This signal condition is also shown in Table I supra.

Thus, it is seen that if the augend and addend signals (e.g. $A_n$ and $B_n$) are different, switch 15 is enabled so that the carry signal (e.g. $C_{n-1}$) applied to the dotted input terminal thereof is transmitted directly through the switch to the succeeding stage. However, if the addend and augend signals are the same, the carry signal is defined by one of the addend and augend signals.

Referring now to stage 51, a similar circuit configuration is shown. A detailed description of the operation of this circuit is unnecessary inasmuch as this circuit operates the same as the circuit in stage 50. That is, if the input signals $A_{n+1}$ and $B_{n+1}$ are identical, then the $B_{n+1}$ signal is transmitted through switch 16 inasmuch as the control signal $X_{n+1}$ is a low level signal. Conversely, if the input signals $A_{n+1}$ and $B_{n+1}$ are different, then control signal $X_{n+1}$ is a binary 1 and switch 16 is enabled so that the carry input signal $C_n$ is transmitted directly therethrough to produce output signal $C_{n+1}$ which is supplied to the next succeeding adder stage.

It is seen from this description that if the input signals $A_n$ and $B_n$ are different and the signals $A_{n+1}$ and $B_{n+1}$ are different, switches 15 and 16 are rendered conductive such that the carry signal from terminal $C_{n-1}$ must ripple through two switches (viz. switches 15 and 16) to terminal $C_{n+1}$, and the inherent delay in these two stages is cumulative in the carry-ripple network (absent the skip-ahead feature to be described). Consequently, while stages 50 and 51 are acting upon their input signals in parallel, the carry networks are acting in series and become the limiting factor in the speed of the operation of the circuit.

However, the skip-ahead or speed-up feature becomes operative under these conditions. For example, NAND gate 14 has one input thereof connected to terminal $X_n$ and the other input thereof connected to terminal $X_{n+1}$ to receive these respective signals. The output of gate 14 is connected to the gate electrode of semiconductor device P3 and to the input of inverter 25. The output of inverter 25 is connected to the gate electrode of semiconductor device N3. Semiconductor devices N3 and P3 have the conduction paths thereof connected in parallel with one end of the parallel connection connected to circuit point 37 and the other end thereof connected to circuit point 39. It is seen that circuit point 37 is common to the terminal to which signal $C_{n-1}$ is applied. Circuit point 39 is associated with the carry-out terminal $C_{n+1}$ of switch 16.

The operation of NAND gate 14 is such that if both input signals supplied thereto are high level signals or binary 1's, a binary 0 is produced thereby. Conversely, if any input signal to NAND gate 14 is a binary 0, a binary 1 is produced thereby. If a binary 1 signal is produced by NAND gate 14, a relatively high level signal is applied to the gate of device P3 and, via inverter 25, a low level signal is applied to the gate of device N3. Under these conditions, gate 24 which comprises devices P3 and N3 is rendered nonconductive.

However, if the $X_n$ and $X_{n+1}$ signals are both high level signals, NAND gate 14 produces a low level or binary 0 output signal. This low level signal is applied to the gate electrode of device P3 and the input of inverter 25 whereby a high level signal is applied to the gate electrode of device N3. With these signal conditions, transmission gate 24 is rendered conductive, whereby circuit points 37 and 39 are electrically connected. Consequently, the carry-in signal at terminal $C_{n-1}$ is transmitted directly to the carry-out signal terminal $C_{n+1}$. Thus, this signal transmission is accomplished through a single gate having only one delay time so that undesirable carry-ripple delay is avoided or minimized.

It is seen that gate 24 is rendered operative or conductive in response to a signal generated by NAND gate 14 only when the signals $X_n$ and $X_{n+1}$ are both binary 1's. Under these conditions, gates 15 and 16 would normally be conductive. If gates 15 and 16 are conductive so that the signal at the dotted input is transmitted directly therethrough, it is seen that the $C_{n-1}$ signal is transmitted to become the $C_n$ signal which is further transmitted to become the $C_{n+1}$ signal. The cumulative delays of gates 15 and 16 are encountered. By bypassing this route and using gate 24, the $C_{n-1}$ signal at circuit point 37 is transmitted directly to be the $C_{n+1}$ signal at circuit point 39 and the speed advantage is obvious.

Adder segments 52 and 53 are substantially identical to stages 50 and 51 in configuration and in operation. NAND gate 21 receives signals $X_{n+2}$ and $X_{n+3}$ from stages 52 and 53 respectively and operates thereon similarly as did gate 14 on its input signals. As a result of the operation of NAND gate 21, transmission gate 26 which includes semiconductor devices P4 and N4 along with inverter 27 operates as did gate 24 noted supra. Consequently, with the appropriate signal conditions, gate 26 can be rendered conductive in response to the operation of gate 21, wherein circuit point 39 is connected to circuit point 38 so that the $C_{n+1}$ signal is transmitted directly through transmission gate 26 to circuit point 38, which is the $C_{n+3}$ output signal terminal.

In the embodiment shown herein, inverter driver circuits 35 and 36 are included in order to provide suitable amplification of the output signal $C_{n+3}$. Thus, the output signal will be shaped and improved for operation by additional external circuitry (not shown). Of course, in an ideal situation, devices 35 and 36 would not be necessary, wherein the $C_{n+3}$ signal would be detected immediately at circuit point 38.

If signal conditions warrant, gates 24 and 26 can both be conductive, Thus, the $C_{n-1}$ signal can be applied to the $C_{n+3}$ carry-out terminal through only two transmission gates (i.e. gates 24 and 26) having only two delay times as opposed to being transmitted through gates 15, 16, 22 and 23, which would encompass four delay times.

If now, the output signals from gates 14 and 21 are also supplied to inputs of NOR gate 28, additional speed-up operations can be achieved. In operation, NOR gate 28 produces a binary 1 or high level output signal in response to all low or binary 0 input signals. Conversely, a low level output signal is produced if one or more of the binary 1 signals are supplied to the inputs of gate 28.

Thus, if one or more of gates 14 and 21 produces a high level output signal, the associated gate 24 or 26 is rendered nonconductive. In addition, gate 28 produces a low level output signal which is applied to the gate electrode of semiconductor device N5 and the input of inverter 30 so that a high level signal is applied to the gate electrode of device P5. Obviously, gate 29 which includes devices P5 and N5 is nonconductive. In this condition, the carry signals must be generated through the carrysripple network as a standard signal to be operated upon.

However, if both gates 14 and 21 produce low level output signals, gate 28 produces a high level output signal. This high level signal is supplied to the gate electrode of device N5 and, because of inverter 30, a low level signal is applied to the gate electrode of device P5. Consequently, gate 29 is rendered conductive, wherein circuit point 37 is connected to circuit point 38 so that the signal at terminal $C_{n-1}$ is transmitted directly to circuit point 38 as the $C_{n+3}$ signal. Here, it is seen that the carry signal is transmitted through a single stage having only one delay time as opposed to either two or four delay times as suggested in any of the parallel circuit paths.

The above description relates to a four-bit adder section. In the event that additional sections are required as for example if an 8 or 16 bit work is utilized in the adder, additional sections similar to that described are connected in series. Moreover, additional skip-ahead paths may be utilized. Such an additional skip-ahead path is suggested at the bottom of FIG. 2 in that NOR gate 32 receives one control signal CTR ($n$—1 to $n$+3) from the output of inverter 30, which control signal may be considered to be the control signal for the $n$—1 through $n$+3 stages. In addition, a control signal CTR ($n$—5 to $n$—1) for the $n$—5 through $n$—1 stages (assuming that another four bit adder section immediately precedes the shown section) is also supplied to gate 32. The output of gate 32 is connected to transmission gate 33 which includes devices N6 and P6. In particular, the output of gate 32 is connected to the gate electrode of device P6 and, through inverter 34, to the gate electrode of device N6. The conduction paths of devices P6 and N6 are connected in parallel. One end of this parallel connection is connected to the $C_{n-5}$ carry-in terminal while the other end of the parallel connection is connected to circuit point 38. Consequently, with the appropriate signals supplied to the input terminals of gate 32, transmission gate 33 is rendered conductive and carry-in signal $C_{n-5}$ will be transmitted directly to circuit point 38, thereby essentially skipping over eight adder segments and having only a single circuit delay. This skip-ahead function is only provided if the appropriate signals are supplied to the addend and augend terminals of each adder circuit. In particular, it will be noted that the skip-ahead feature only operates if at least two adjacent stages each have complementary inputs supplied to the addend and augend input terminals thereof. In order to have skip-ahead of the carry signals from the initial carry-in stage to the ultimate carry-out terminal, all of the addend and augend signals for each stage must be complementary, which is a rather unusual condition.

The input terminal of inverter driver 31 is connected to the output terminal of NOR gate 28. Inverter 31 inverts the output signal from gate 28 and produces control signal CTR' ($n$—1 to $n$+3), which is supplied to a further control gate (not shown) similar to gate 32. Control signal CTR' ($n$—1 to $n$+3) is indicative of the condition permitting the skip-ahead of the carry signal from terminal $C_{n-1}$ through to terminal $C_{n+3}$. Thus, inverter 31 produces a signal which is of the same phase and level as is produced by inverter 30. In fact, the signal produced by inverters 30 and 31 may be considered to be identical. In addition, inverter 31 operates as a driver similar in function to inverters 35 and 36 wherein the output signal is appropriately operated upon to drive the relatively high capacitance external to the chip on which this circuit appears. Moreover, inasmuch as a plurality of skip-ahead bypass circuits are "phantom ORed" together at circuit point 38, a relatively large circuit capacitance is produced wherein the driver output circuits may be desirable.

Thus, there has been shown and described a transmission gate carry skip-ahead circuit and network which is especially useful in an adder circuit application. The skip-ahead feature permits more rapid operation of the transmission of a carry signal through the adder circuit. Inasmuch as the carry-ripple delay time is normally the limiting speed consideration in an adder circuit, the implementation of a network which permits more rapid transmission of this carry signal is desirable.

While the circuit has been shown to include MOS type semiconductor devices, it is understood that other, suitable, types of semiconductors or the like may be utilized. Those skilled in the art will recognize that the signal levels may be changed if the semiconductor device types are reversed or the like. However, any changes or modifications to the circuit which fall within the inventive concepts are intended to be included within this description. The specific devices shown and described are illustrative only and are not limitative of the invention. The scope of the invention is limited only by the claims attached hereto.

What is claimed is:

1. In combination, a plurality of adder circuit stages, each of said adder circuit stages including sum logic circuit means for producing a sum output signal, each of said adder circuit stages including carry logic circuit means for producing a carry output signal, gate means connected to the sum logic circuit means pf certain adjacent adder circuit stages to produce an output signal indicative of the signal conditions at the associated said sum logic circuit means, and circ it means connected to said gate means to receive the output signal therefrom and to selectively connect the carry input of the carry logic circuit means of the first of said certain adder circuit stages to the output of the carry logic circuit means in the last of said certain adjacent adder circuit stages.

2. The combination recited in claim 1 wherein said sum logic circuit means includes first and second exclusive OR gates, each having two input terminals and an output terminal, said input terminals of said first OR gate connected to receive addend and augend signals, respectively, said input terminals of said second OR gate connected to receive the carry-in signal from a previous stage, and the output signal from said first exclusive OR gate respectively, said second exclusive OR gate operative to produce the sum output signal on the output terminal thereof.

3. The combination recited in claim 1 wherein said carry logic means includes switch means having two input terminals, a control terminal and an output terminal, one of said input terminals connected to receive one of the addend or augend signals supplied to the adder circuit stage, the other input terminal connected to receive the carry-in signal supplied to the adder circuit stage, and the control terminal connected to said sum logic circuit to receive a signal therefrom representative of the relation between the addend and augend signals supplied to the adder circuit stage.

4. The combination recited in claim 2 wherein said gate means is connected to receive signals from the outputs of the first exclusive OR gates in at least two adjacent adder circuit stages.

5. The combination recited in claim 4 wherein said circuit means comprises switch means connected to said gate means, said switch means being selectively rendered conductive in response to a signal from said gate means.

6. The combination recited in claim 5 wherein said switch means includes a pair of opposite conductivity type semiconductor devices, having the conduction paths thereof connected in parallel one end of said parallel connected conduction paths connected to an input of said carry logic circuit means of the first one of said certain adjacent adder circuit stages and the other end of said parallel connected conduction paths connected to the output of said carry logic circuit means in the last one of said certain adjacent adder circuit stages.

* * * * *